D. J. Owen.
Animal Trap.
No. 89,429. Patented Apr. 27, 1869.

Witnesses
R. F. Radebaugh
Frank Frigy

Inventor:
D. J. Owen
By his Attorneys
McGill Grant & Co

D. J. OWEN, OF SPRINGVILLE, PENNSYLVANIA.

Letters Patent No 89,429, dated April 27, 1869.

IMPROVED ANIMAL-TRAP.

The Schedule referred to in these Letters Patent and making part of the same.

*To all whom it may concern:*

Be it known that I, D. J. OWEN, of Springville, in the county of Susquehanna, and State of Pennsylvania, have invented a new and useful Self-Adjusting Animal-Trap; and I do hereby declare that the following is a full and exact description thereof, reference being had to the accompanying drawings, making part of this specification, and to the letters of reference marked thereon, in which—

Figure 1:
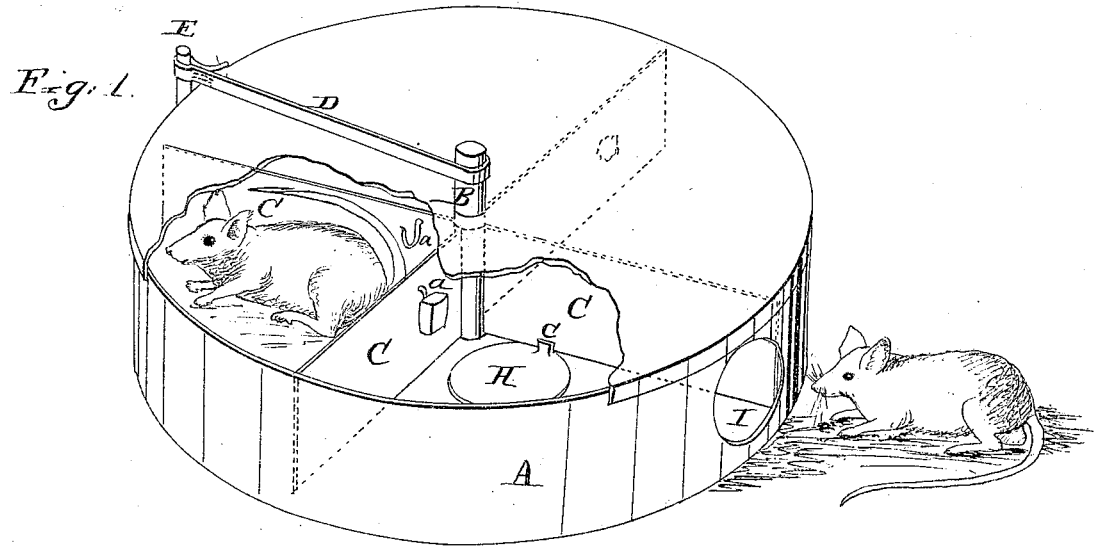
Figure 2:
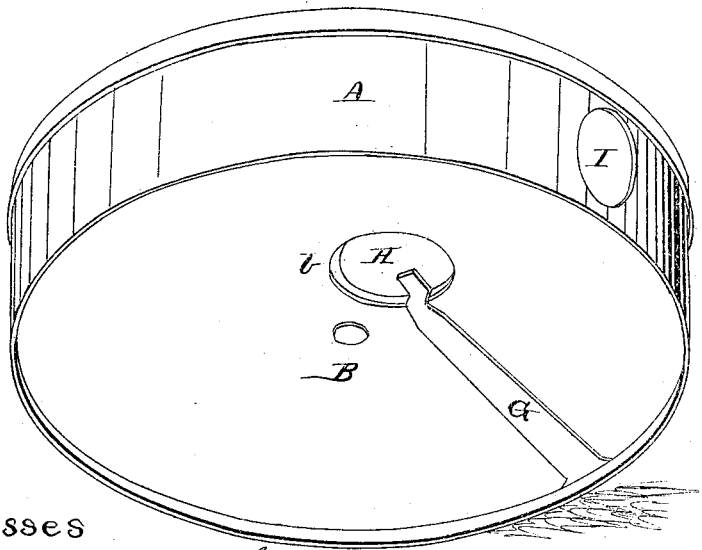

Figure 1 represents a perspective view of the upper portion of the trap, with part of its top removed, so as to show the arrangement of the winged centre, and Figure 2 represents a similar view of the bottom of the trap, showing its spring-platform.

Similar letters of reference indicate corresponding parts.

A represents the frame of the trap, which is made in the shape of a cheese-box, and of any desired size and material.

B is a cylindrical pinion, running through the centre of the trap.

This pinion is furnished with the wings C, which divide the centre of the trap into four compartments.

D is a taut elastic spring, one end of which is attached to the top of the pinion B, and the other to the holder E.

*a a* are the bait-hooks.

G is a flat spring, fastened at the side of the trap, and extending across its bottom to the opening *b*, into which it bends, and where it is provided with the platform H, the upper portion of which is provided with the tooth, or catch *c*.

The bottom of the trap is placed up in the body sufficiently high to admit of the platform H playing up and down.

I is the opening, through which the animals enter the trap.

The operation of the trap is as follows:

The hooks *a a* are baited, and the spring G pressed down until the bottom of the wings C can clear the tooth *c* in the platform H. The wings C are then turned around once, by means of the pinion B, causing the taut elastic spring D to coil around the head of the pinion. The spring G is then let up, which prevents the wings C from turning back again, on account of the tooth *c* obstructing their passage, and the trap is thereby set.

An animal, on entering the trap, in getting to the bait is compelled to tread upon the platform H, causing it to sink, and thereby loosening the wing resting against the tooth *c*, which, revolving by the uncoiling of the elastic spring D, shoves the animal off the platform H, thereby causing the platform to rise, and resetting the trap by the tooth *c* obstructing the passage of the next wing, and caging the animal, as seen in fig. 1.

This is repeated until the spring D is entirely uncoiled from the head of the pinion B, which, in a four-winged trap, will not occur until three animals have been caught.

What I claim as my invention, and desire to secure by Letters Patent, is—

1. The construction and arrangement of the pinion B, with its wings C in the frame A, and operating by means of the spring D, and toothed-spring platform H, in the manner shown, and for the purpose herein set forth and described.

2. The toothed-spring platform H, constructed as shown, and attached to the bottom of the trap, so as to operate through the opening *b*, in the manner and for the purposes herein set forth and described.

In testimony that I claim the foregoing invention, I have hereunto set my hand, this     day of January, 1869.

D. J. OWEN.

Witnesses:
MILES PRICHARD,
W. W. PRICHARD.